United States Patent [19]

Johnson

[11] Patent Number: 4,842,788
[45] Date of Patent: * Jun. 27, 1989

[54] PROCESS OF AN APPARATUS FOR EXTRUDING A MELTABLE COMPOSITION

[75] Inventor: D. Emil Johnson, Canandiagua, N.Y.

[73] Assignee: Mobil Oil Corporation, New York, N.Y.

[*] Notice: The portion of the term of this patent subsequent to May 23, 2006 has been disclaimed.

[21] Appl. No.: 140,443

[22] Filed: Jan. 4, 1988

[51] Int. Cl.[4] .................. B29C 35/00; B29C 47/00; B29C 47/60; B29C 47/80

[52] U.S. Cl. .................. 264/68; 264/211.23; 366/76; 366/79; 366/81; 366/89; 366/99; 366/307; 366/322; 425/190; 425/208; 425/209; 425/382.3

[58] Field of Search ............ 264/68, 176.1, 211.1, 264/211.21, 211.23, 349; 425/190, 207, 208, 209, 381.2, 382.3; 72/262, 270; 366/76, 79, 81, 89, 99, 305, 307, 319, 322

[56] References Cited

U.S. PATENT DOCUMENTS

| | | | |
|---|---|---|---|
| 3,093,861 | 6/1963 | Rex | 264/349 |
| 3,175,248 | 3/1965 | Swenson | 425/207 X |
| 3,267,524 | 8/1966 | Morse | 366/79 |
| 3,856,278 | 12/1974 | Eisenmann | 425/209 X |
| 3,881,708 | 5/1975 | Carle | 366/89 X |
| 3,888,997 | 6/1975 | Guibert | 366/81 X |
| 3,900,188 | 8/1975 | Seufert | 425/208 X |
| 3,954,366 | 5/1976 | Fields | 425/208 |
| 4,015,832 | 4/1977 | Kruder | 366/76 |
| 4,155,655 | 5/1979 | Chiselko et al. | 366/89 X |
| 4,250,132 | 2/1981 | Beach | 264/68 |
| 4,253,771 | 3/1981 | Renk | 366/89 |
| 4,344,710 | 8/1982 | Johnson et al. | 366/76 |
| 4,356,140 | 10/1982 | Kruder | 264/211.23 |
| 4,419,014 | 12/1983 | Gale | 366/99 |
| 4,494,877 | 1/1985 | Upmeier et al. | 366/76 |
| 4,643,660 | 2/1987 | Capelle | 425/190 |
| 4,712,992 | 12/1987 | Kim | 425/207 |

FOREIGN PATENT DOCUMENTS

| | | | |
|---|---|---|---|
| 55-28816 | 2/1980 | Japan | 425/208 |
| 57-75832 | 5/1982 | Japan | 425/208 |
| 59-224327 | 12/1984 | Japan | 366/79 |
| 60-115424 | 6/1985 | Japan | 366/79 |

Primary Examiner—Jeffery Thurlow
Assistant Examiner—Leo B. Tentoni
Attorney, Agent, or Firm—Alexander J. McKillop; Charles J. Speciale

[57] ABSTRACT

Extrusion machine and process, the machine having a barrel having a feed section for receiving solid extrusion material, and containing a screw for moving the solid extrusion material through a solids conveying section to a compression section of the barrel to generate heat and pressure to melt the extrusion material and force the melt through a downstream extrusion die. The solids conveying section of the barrel has a cross-section comprising a plurality of flat or slightly curved surfaces which extend substantially tangentially relative to the extrusion screw circumference, providing axial recesses which restrain the rotation of the solid extrusion material with the screw as it is moved axially into the compression section. The present machine and process causes plastic extrusion composition to be packed as a non-rotating mass to fill the solids-conveying and compression sections and increase the dead head pressure and extrusion output of the machine.

13 Claims, 3 Drawing Sheets

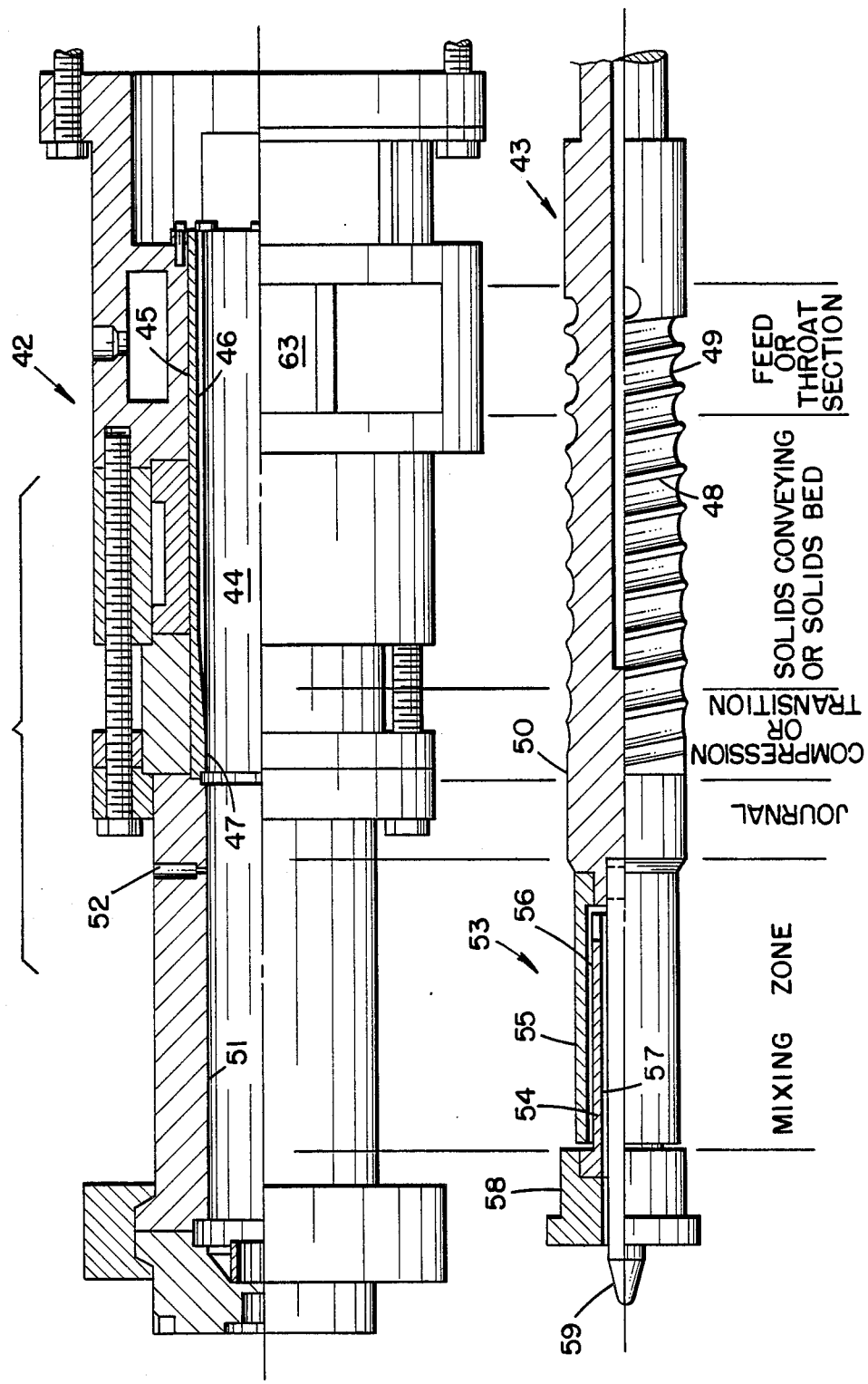

PROCESS OF AN APPARATUS FOR EXTRUDING A MELTABLE COMPOSITION

BACKGROUND OF THE INVENTION

The present invention relates to improvements in extrusion machines and to a method for improving the performance of such machines in extruding meltable compositions, such as polymers, metals, and other extrudable materials more effectively and efficiently.

Conventional extrusion machines include those of the type illustrated by my U.S. Pat. No. 4,344,710. Such machines generally have a barrel and screw ratio of length to diameter of at least 16:1 and generally from 24 to 36:1, to accommodate a feeding zone, compressing zone, heating zone(s), mixing zone, and cooling zones(s). The solid extrusion composition is fed into the feed zone (throat) in powder, granular, or pellet form, where it enters the screw channel and rotates with the screw during axial movement to the compression zone. Such rotation of the solids bed with the screw inside the smooth barrel produces undesirable frictional heat generation which softens the solids and limits or prevents the axial movement of solid material. To prevent this frictional heat build-up, the screw and barrel are generally water cooled in the throat and feed zones.

Extruders with grooved barrels and throats are used by the plastics industry because they forward the solids axially with the screw and resist or prevent the solids from rotating with the screw inside the barrel. These grooved barrel extruders use energy more efficiently than smooth bore extruders in melting and pumping the composition. However, there appears to be a practical size limitation for the screw diameter, about $3\frac{1}{2}$ inches. Barrel and screw cooling is also critical on these grooved barrel extruders because elevated temperatures prematurely soften the extrudate in the barrel grooves allowing the softened solids to turn in the barrel with the screw rather than advancing in the axial direction. The typical axial groove in a conventional grooved barrel is constructed with parallel sides spaced apart by about 2 diameters of a plastic resin pellet and have an average groove depth approximately equal to the groove width. The depth of these grooves is about $1\frac{1}{2}$ times their width in the feed throat zone and taper to no depth at the end of 6 to 9 barrel diameters of length. These typical grooves are difficult to clean when they plug or bridge because of interrupted cooling or excessive back pressure.

SUMMARY OF THE INVENTION

The present invention involves several related discoveries which led to the design of a novel screw extrusion apparatus, method for improving the performance thereof and system for extruding composition therewith.

A first discovery is that extrusion composition can be restrained most effectively against rotation within the feed section and solids conveying section of an extrusion barrel by forming such section of the barrel with a plurality of axial flat surfaces which merge to provide axial recesses which restrain the rotation of the solid extrusion material packed therein but permit smooth axial movement thereof along the barrel into the compression zone. This prevents stagnation of the composition in the feed zone, excess heating, melting or bridging of the composition in the feed zone and in the throat of the feed hopper and minimizes the need for water cooling of the feed section. Moreover, it improves the uniform and rapid feeding of dry composition into and through the feed section.

A second discovery is that the rotation-restrained solid composition in the solids section forms a solids bed of composition which substantially fills the screw channel and generates sufficient force to melt and forward material through the mixing section and downstream extrusion die and substantially increases the output of the apparatus in pounds per hour per horsepower.

Yet another discovery relating to the novel apparatus of the present invention is that the increased solids pressure gives rise to adiabatic conditions sufficient to melt the extrusion composition without the need for applying external heat. The compression of the solid or semi-solid composition is caused by the shallowing of the screw channels, generating sufficient pressure and heat to melt the composition to a viscous condition suitable for extrusion. Little external heating and no eventual external cooling is required and therefore the length of the extrusion barrel and screw may be reduced substantially and energy is conserved.

According to a preferred embodiment of the invention, the barrel in the areas of the solids feeding and conveying sections is polygonal, most preferably octagonal or hexagonal in cross-section, and the extrusion screw has a vaulted helical channel, at least in the solids conveying section thereof.

According to another preferred embodiment, the feed throat section of the barrel is provided with increased diameter to facilitate the movement of the dry composition from the feed hopper and around the barrel to fill the axial barrel grooves uniformly.

THE DRAWINGS

FIG. 1 is a perspective view of a compact plastic extrusion apparatus according to one embodiment of the present invention, illustrated in test mode;

FIG. 2 is a cross-sectional view of a screw extrusion section of the apparatus of FIG. 1;

FIG. 3 is a cross-sectional view along the line 3—3 of FIG. 2;

FIG. 4 is an elevation view of a portion of a standard extrusion screw used according to the invention and having a shallow channel;

FIG. 5 is a cross-sectional view along the line 5—5 of FIG. 4;

FIG. 6 is an elevation view of a portion of another standard extrusion screw used according to the invention and having a deeper channel;

FIG. 7 is a cross-sectional view along the line 7—7 of FIG. 6;

FIG. 8 is an elevation view of a portion of a novel vaulted extrusion screw used according to a preferred embodiment and having a vaulted channel;

FIG. 9 is a cross-sectional view along the line 9—9 of FIG. 8, and

FIG. 10 is a sectional plan view of an assembly of an extrusion apparatus comprising a barrel housing and a most preferred vaulted extrusion screw, shown in spaced relation for purposes of illustration and indicating the various functional sections of the apparatus.

DESCRIPTION OF THE DRAWINGS

FIG. 1 is outfitted as a pressure-measurement test apparatus with a downstream valve 19 which is supported for adjustable pressure movement to seal the exit end of the extrusion barrel 17 by means of an air cylinder 20. The feed section of the housing 18 carries a vertical clear resin hopper 22 over a throat 21 which opens into the feed section 23 of the housing 18.

Figure 1:
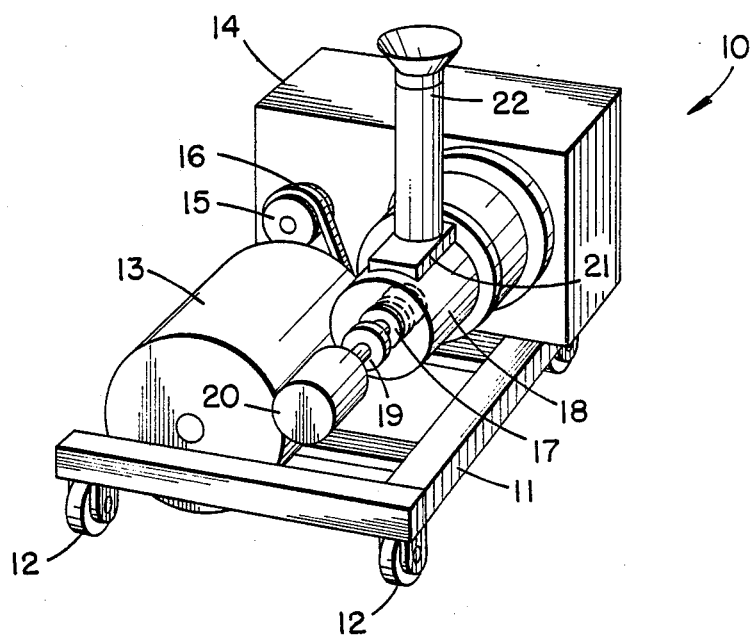
Referring to FIG. 1 of the drawings, the compact portable plastic extrusion apparatus 10 thereof comprises a steel frame 11 having casters 12 for portability over a supporting surface. The frame 11 carries a drive motor 13 connected to a gearbox 14 by means of a 2:1 sheave coupling 15 and belt 16. Gearbox 14 revolves the extrusion screw, shown in FIG. 2, in the extrusion housing 18 to deliver molten plastic extrusion composition to a conventional die adaptor and extrusion die, neither of which is present on the apparatus of FIG. 1. Instead.

The apparatus 10 of FIG. 1, minus the valve 19 and air cylinder 20 is completely operative for the efficient extrusion of dry plastic compositions, such as pellets, introduced through hopper 22, upon attachment of a conventional extrusion screw, die adaptor and extrusion die to the exit end of the extrusion barrel 17 in conventional manner. However, the apparatus of FIG. 1 can be modified to adapt it to other process conditions, such as for example, use of a strand die, water bath, pelletizer for recycling of extrusion scrap, etc.

Figure 2:
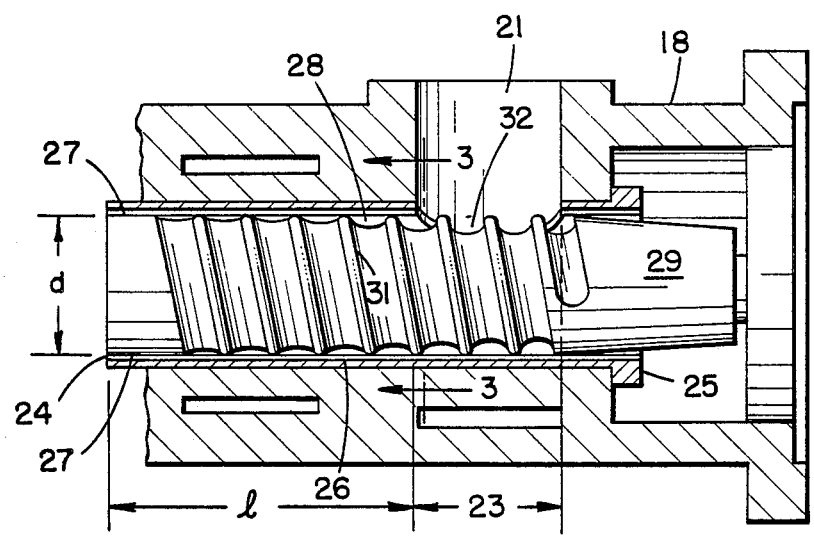

The apparatus according to FIG. 1 comprises an abbreviated 4½ inch Hartig extruder with a 2.33 length-/diameter barrel ratio, i.e., a diameter −d, between opposed flat surfaces, of 4½ inches and a barrel length −1, from the exit of the feed section 23 to the downstream end 24, of 10½ inches as shown in FIG. 2. The length of the barrel 17 preferably is from about 6 to 18 inches and the diameter of the barrel 17 preferably is from 3 to 6, inches in the area of the barrel extending from the exit of the feed section 23 to the entrance of the compression section. Also, within said barrel area, the barrel 17 and the extrusion screw 29 preferably have a length -to-diameter ratio of up to about 3:1. The feed hopper 22 is formed from clear Lexan sheet for strength and clarity to view the feeding progress of the extrusion pellets. The motor 13 is a 150 h.p., 2000 rpm electric motor available from General Electric Company and the gearbox is a Hartig 17.1:1 ratio gearbox.

As illustrated by FIG. 2, the suitable apparatus includes a tubular barrel insert 25 having a smooth keyed exterior surface and an inner surface which has a hexagonal cross-section portion 26 in the upstream solids conveying section of the barrel and blending into a conventional circular cross-section portion 27 extending downstream from the point where the screw flights vanish.

Figure 3:
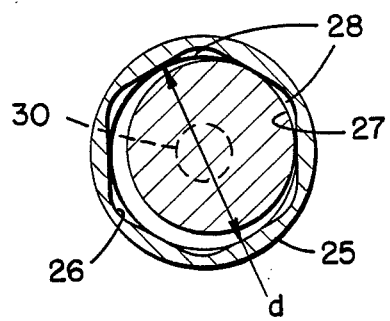

As illustrated by FIG. 3, the inner hexagonal surface 26 of barrel insert 25 provides six spaced axial recesses or corners 28 which anchor the solid extrusion composition against rotation therewithin to form, in effect, a solid "nut" or bed portion of composition which moves axially as a solid unit along the rotating screw. FIG. 3 also illustrates the circular portion 27 of the insert, at the exit of the compression section, into which the hexagonal portion and its recesses 28 gradually blend through the length of the compression section, as illustrated more clearly by FIG. 10.

Figure 6:
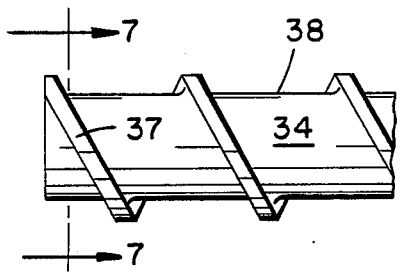
Figure 7:
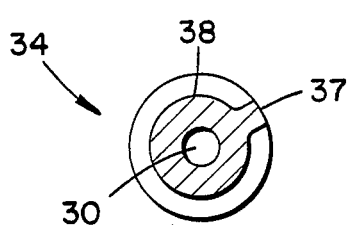

Returning to FIG. 2, the apparatus thereof also includes a unique vaulted extrusion screw 29 having an overall length of 20 inches, a tapered drive end and a 1 inch central core 30, shown in FIGS. 3, 5, 7 and 9, for cooling purposes. The screw 29 of FIG. 2 has a single thread flight 31 having a pitch of 1.5 inches, forming therebetween a continuous vaulted channel 32 having a maximum depth, in the feed section 23, of about ½ inch. In the embodiment of FIGS. 2 and 3, the diameter d of barrel sections 26 and 27 is about 4½ inches and the maximum diameter of the screw 29, between the crests of threads is about 4.470 inches to provide rotational clearance within the barrel insert. FIGS. 4 to 9 illustrate other suitable screw configurations which can be substituted for the screw 29 of FIG. 2 and have a length and diameter similar thereto. The screws 33 of FIGS. 4 and 5 and 34 of FIGS. 6 and 7 are conventional single flight standard or flat channel screws each having a thread width of ⅜ inch and a pitch of 4.5 inches. They differ only in that the flight 35 of screw 33 provides a standard continuous channel 36 about 0.325 inch in maximum depth while the flight 37 of screw 34 provides a standard continuous channel 38 about 0.70 inch in maximum depth.

Figure 8:
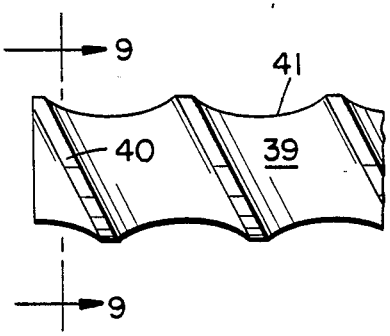
Figure 9:
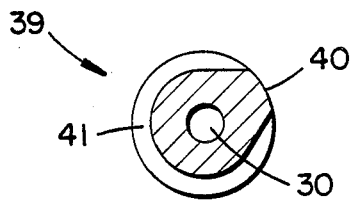

The screw 39 of FIGS. 8 and 9 is a unique vaulted screw having a single ⅜ inch wide thread flight 40 having a pitch of 4.5 inches and a vaulted continuous channel 41 having a maximum depth of about 0.625 inch.

Vaulted screws, particularly those having uniform width channels such as screw 29 and channel 32 of FIGS. 2 and 3 and screw 39 and channel 41 of FIGS. 8 and 9, are preferred because they provide less contact area with the extrusion composition than do standard channel screws and flat recesses and therefore produce less drag or resistance to screw rotation. The nature of vaulted channel shape is to compress the solids as it conveys it forward.

In order to measure the dead head pressure and progressive head pressure of the novel apparatus of the present invention and to compare these values with an identical control apparatus having a smooth extrusion barrel, the test apparatus 10 of FIG. 1 was assembled and modified in the following manner. The extrusion housing 18 was initially provided with an extrusion barrel in the form of an insert similar to 25 of FIG. 2 but having a convention cylindrical inner surface which is uniformly round or circular in cross-section, similar to surface 27 of FIG. 3 but extending along the entire length thereof including the feeder section, but not obstructing the throat. This is referred to as barrel 1 in the following Table.

Figure 4:
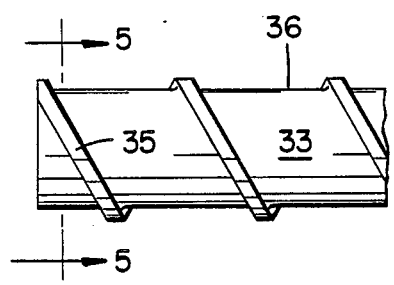
Figure 5:
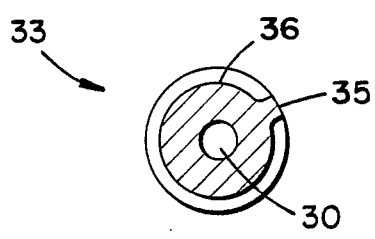

In sequence, the test apparatus 10 of FIG. 1, containing barrel 1, was outfitted with the extrusion screws of FIGS. 4, 6 and 8, referred to as screws A, B and C in the following Table.

A pressure, measurement air valve assembly comprising a 6" air cylinder 20 having a valve plate 19 attached to the piston end thereof was secured to the frame 11 for closing engagement with the exit end 24 of the smooth bore barrel. The air valve assembly is designed to measure dead head pressure in pounds per square inch (PSI), i.e., the maximum restraining pressure, exerted by the valve 19 on the downstream end of the barrel, that the extrusion composition can pump against to open the valve from closed position and continue to pump against to extrude the composition. The air valve assembly is also designed to measure progressive head pressure in pounds per square inch (PSI), i.e., the pressure exerted by the valve 19, in slowly closing from open position until it cuts off the flow of extrusion material from the end of the barrel after the extrusion apparatus has been in normal operation.

In each case, the extrusion apparatus is continuously fed in identical manner with an identical dry extrusion composition comprising pellets of polystyene resin.

In addition, the output of each apparatus was determined under both unrestricted and restricted conditions by timing a six inch drop of the resin level in the clear supply hopper 22. Unrestricted output weight was extrapolated in terms of pounds per hour (PPH) from the weight of material extruded in the time period with the valve 19 in fully open position. Restricted output weight was extrapolated in terms of pounds per hour (PPH) from the weight of the material extruded in the time period with the valve urged from open towards closed position under a pressure equal to the dead head pressure, which is less than the progressive head pressure and therefore permits the release of extrusion material from the barrel.

TABLE 1

| Barrel | Screw | Progressive (PSI) | Dead (PSI) | Open (PPH) | Restricted (PPH) |
|---|---|---|---|---|---|
| 1 | A | 160 | 53 | 1392 | 711 |
| 1 | B | 249 | 142 | 2265 | 1400 |
| 1 | C | 214 | 125 | 2131 | 955 |

To demonstrate the substantial, unexpected advantages of the present invention, resulting from the use of the rotation-restraining barrel sections of the present invention, particularly the hexagonal cross-section barrel of FIGS. 2 and 3 in combination with the same extrusion screws A, B and C, the test apparatus of FIG. 1 was remodified to replace the round cross-section barrel insert 1 with the barrel insert 25 of FIGS. 2 and 3 and the tests of Table 1 were repeated in identical manner. Table 2 gives the corresponding values obtained with barrel 25 of FIGS. 2 and 3, referred to as barrel 2 in Table 2, in association with the same screws A, B and C used in Table 1.

TABLE 2

| Barrel | Screw | Progressive (PSI) | Dead (PSI) | Open (PPH) | Restricted (PPH) |
|---|---|---|---|---|---|
| 2 | A | 3916 | 223 | 2092 | 1795 |
| 2 | B | 3204 | 445 | 3732 | 3341 |
| 2 | C | 4450 | 3916 | 2327 | 2327 |

A comparison of the results illustrated by Tables 1 and 2 demonstrates that the use of the present irregular rotation-resisting barrel feed section results in dramatic and unexpected increases in the progressive head pressure, dead head pressure and output, both unrestricted and restricted, when both standard and vaulted extrusion screws are used, as compared to the results obtained when a standard smooth barrel having a smooth 4½ inch diameter is used in association with the same extrusion screws.

An explanation for these results appears to be the cooperation between the polygonal barrel and the screw channel which causes the solid particulate extrusion composition to pack within and fill the barrel, including the helical screw channel and the axial barrel grooves in the solids conveying section of the barrel, the heat generated within the solids conveying section being sufficient to cause the compressed particles to adhere to each other as a solid mass which cannot rotate but can move axially along the screw to plug the barrel at the entrance to the compression zone of the barrel. The axial grooves in the barrel progressively diminish in the compression zone until they vanish at the downstream end of the compression zone, as illustrated by FIG. 10. The present structure provides a very uniform melt, unaffected by cycling heaters, and has very little effect on the melt index of the composition since the composition, such as polystyrene is at a maximum temperature of 320° F. or less for only about six seconds time, i.e., downstream of the solids conveying section shown in FIG. 10.

It will be seen from a comparison of Tables 1 and 2 that the smooth standard barrel 1 of Table 1 lost 681 pph or 49% of its unrestricted output with screw A, 865 pph or 38% of its unrestricted output with screw B and 1176 pph or 55% of its unrestricted output with screw C, when it was restricted to its dead head pressure. In contrast, the hexagonal barrel 2 of Table 2 lost only 297 pph or 14% of its unrestricted output with the same screw A, 391 pph or 10-1.2% of its unrestricted output with the same screw B and had absolutely no loss of its unrestricted output with the same screw C as used in Table 1. Barrel 2 has a minimum head pressure potential 64 times that of barrel 1 and the average progressive cut off head pressure for the smooth bore barrel 1 was found to be 208 psi whereas the average progressive cut off head pressure for the hexagonal barrel 2 was found to be 13,350 psi (minimum) when used with the vaulted screw. This is the present limit of the test apparatus.

FIG. 10 is an assembly of an extrusion apparatus according to the present invention showing the barrel section 42 and the extrusion screw 43 in partial cross-section and in spaced alignment for purposes of illustration.

The various functional sections of the barrel section 42 and the screw 43 are identified in FIG. 10 as the feed or throat section, the solids conveying or solids bed, the compression or transition section, journal section and mixing zone.

The barrel section 42 comprises a central axial bore 44, the upstream half of which receives therein a keyed, removable polygonal barrel insert 45 similar to insert 25 of FIGS. 2 and 3 and having a plurality of axial grooves 46 which extend from the upstream end of the insert and taper down and disappear to form cylindrical barrel area 47 at the exit of the compression or transition section of the apparatus, where the solid or semi-solid extrusion composition becomes liquified.

The extrusion screw 43 of FIG. 10 is similar to screw 29 of FIG. 2 in that it has a single thread flight 48 having a pitch of 1.5 inches, a continuous vaulted recess 49 having a maximum depth of about 0.5 inch in the feed section and a reduced depth through solids conveying section until it progressively shallows and disappears and the screw 43 forms a cylindrical bearing portion 50 downstream of the compression section of the apparatus corresponding to the area 47 where the barrel insert also becomes cylindrical due to the shallowing of the axial grooves 46.

The bearing portion 50 of the extrusion screw 43 extends into the downstream cylindrical barrel portion 51, spaced therefrom by a narrow annulus, i.e., about 0.020 inch, through which the liquified extrusion composition is forced to a mixing zone immediately in advance of the discharge end of the apparatus. Barrel portion 51 can include an injection port 52 for the introduction of a conventional blowing agent to the liquified extrusion composition in the mixing section in cases where expandable or foamed products are being produced.

The extrusion screw 43 of FIG. 10 includes a novel mixing element 53 comprising a non-rotating inner mixing sleeve 54 supported by the anchor 58 secured to the end of the barrel element 42, and an outer mixing sleeve 55 supported for rotation with the journal end of the screw shaft 43. Liquified extrusion composition is forced through the bearing annulus 50 over the outer mixing sleeve 55, down into the cylindrical space between sleeves 55 and 54, upstream around and under the inner sleeve 54 and downstream through cylindrical space 57 between the inner sleeve 54 and the center shaft 59, and extending out between the shaft 59 and the anchor 58. The rotation of the outer mixing sleeve 55 and the central shaft 59 with the extrusion screw 43 and the fixed position of the inner mixing sleeve 54 produces a strong shearing action on the extrusion composition which results in the formation of a more homogeneous mixture of the blowing agent and the remainder of the extrusion composition. The end of the barrel housing is coupled to a conventional extrusion die adaptor.

In operation, solid extrusion composition, such as pellets, is introduced to the barrel housing 42 through feed port 63 and enters the feed or throat section to fill the deep vaulted channel 49 of the screw 43. The vaulted channel provides axial compression of the pellets out against the polygonal inner surface of the barrel insert 45 to fill the axial grooves 46 and form a solid nut or pellet composition which moves axially along the screw with the rotation thereof. The channel 49 in the solids conveying section increases the compression of the nut, and rotation of the nut is prevented by the hexagonal cross-section of the insert 45. The flat axial inner walls of the barrel insert 45 extend somewhat tangentially to the screw surface to provide a shear-resistant restraint via rotational compression, as opposed to narrow grooves having side walls extending somewhat radially relative to the screw which permit shear between the filling in the grooves and the remainder of the solid composition and permit the latter to rotate rather than moving axially.

In the apparatus of FIG. 10, the solids move axially from the feed section, which is about five inches in length in the embodiment of FIG. 10, into the solids conveying section, which is about eleven inches in length. High compression of the composition begins near the downstream end of the solids conveying section and is completed in the compression or transition section, which is about three inches in length. Adiabatic conditions cause the solid composition to liquefy, with little or no external heating required, as the screw channel 49 and the barrel grooves 46 gradually shallow within the compression section and surface and disappear at areas 47 and 50 of the barrel insert 45 and the screw 43, respectively, at the end of the compression section. The progressive head pressure is exerted in the downstream direction since dissipation in the upstream direction is prevented by the solid extrusion composition which fills and plugs the solids conveying section.

The liquid extrusion composition is forced through the narrow annulus between surfaces 47 and 50 and surfaces 51 and 50 and enters the mixing zone into which gaseous or liquid blowing agents may be introduced through injection port 52.

The mixing element 53, if present, shears and kneads the composition to form a homogeneous liquid. In the embodiment illustrated, the mixing element 53 is about eleven inches in length but causes the liquid to pass this length three times for a total of about thirty inches before it enters the extrusion die adaptor. This provides excellent mixing and shearing of the composition with a minimal increase of the length of the screw and barrel housing.

While the preferred extrusion barrels of the present invention are polygonal in cross-section it will be clear to those skilled in the art, in the light of the present disclosure, that the axially-flat surfaces of a polygonal barrel can be replaced with slightly curved surfaces so long as such surfaces extend substantially tangential to the extrusion screw flight. For example a trilobular or bilobular extrusion barrel, having a cross-section similar to that of a Wankel-type engine, will also provide the desired rotational restraint and compression plus the necessary shear resistance.

It is to be understood that the above described embodiments of the invention are illustrative only and that modifications throughout may occur to those skilled in the art. Accordingly, this invention is not to be regarded as limited to the embodiments disclosed herein, but is to be limited as defined by the appended claims.

I claim:

1. An apparatus for receiving and extruding solid meltable composition into a desired shape, comprising an elongate extrusion barrel containing an elongate extrusion screw having at least one helical screw flight forming a helical channel or channels, means for rotating said screw within said barrel, said barrel comprising a feed section which is open to receive a continuous supply of solid, meltable extrusion composition therein for engagement with the extrusion screw, a solids conveying section which is open to said feed section to receive solid extrusion composition moved axially thereto from the feed section by rotation of the screw, and a compression section which is open to said solids conveying section to receive solid extrusion composition moved axially thereto from the solids conveying section by rotation of the screw and to compress and melt the composition, said compression section being in communication with a downstream extrusion orifice to which the melted composition is advanced for extrusion in a desired shape, the feed and solids conveying sections of the barrel having an interior surface having a plurality of flat or slightly curved axial surfaces which extend somewhat tangentially relative to the flight of the extrusion screw and merge to form a plurality of axial grooves on the interior surface of the barrel, which grooves promote rotational compression of the composition therewithin by means of the extrusion screw to substantially prevent rotation of the packed composition while permitting axial movement of the packed composition by the screw into the compression section of the barrel, the channel or channels of the extrusion screw and the axial grooves of the extrusion barrel both diminishing within the compression section of the barrel so that both the screw and the barrel are substantially cylindrical at the downstream end of the compression section to provide a narrow annular slot therebetween for passage of the melted composition to the downstream extrusion orifice.

2. An apparatus according to claim 1 in which said barrel comprises a removable barrel insert.

3. An apparatus according to claim 1 in which the interior surface of the solids conveying section of the barrel is polygonal in cross-section.

4. An apparatus according to claim 1 in which the helical screw channel of the extrusion screw has a depth which decreases from a maximum value in the area of the feeder section to a minimum value in the area of the downstream end of the compression section.

5. An apparatus according to claim 1 in which said elongate extrusion barrel and extrusion screw have a length to diameter ratio of up to about 3:1 from the exit of the feed section to the entrance of the compression section.

6. An apparatus according to claim 5 in which said barrel has a length of from about 6 to 18 inches and a diameter of from about 3 to 6 inches from the exit of the feed section to the entrance of the compression section.

7. An apparatus according to claim 1 in which said extrusion barrel contains more circumferential clearance in the area of the feed section thereof to facilitate the introduction of the solid extrusion composition into the axial grooves thereof.

8. An apparatus according to claim 1 in which said extrusion screw further comprises a mixing element downstream of the compression section, said mixing element comprising a downstream-extending outer sleeve which is rotatable with the screw, and an upstream-extending fixed inner sleeve spaced therefrom to provide therebetween an annular slot through which the melted extrusion composition is forced back upstream to a conduit extending back downstream to the extrusion orifice.

9. An apparatus according to claim 8 in which the barrel housing includes an injection port for introducing additives to the composition in the area of the mixing element.

10. A method for the extrusion of an extrusion composition through a plastic extrusion apparatus having an elongate extrusion barrel containing an elongate extrusion screw rotatable therewithin to move solid extrusion composition from a feed section of said barrel to and through a solids conveying section to a compression section for the melting thereof and to a downstream extrusion orifice for the extrusion of said melted composition, said method comprising providing said extrusion barrel with a plurality of flat or slightly curved axial surfaces which extend somewhat tangentially relative to the circumference of the screw, and which merge to form a plurality of axial grooves which extend through the feed section and the solids conveying section thereof and which disappear at the exit end of the compression section of the barrel, and providing said extrusion screw with at least one helical screw thread providing a helical screw channel or channels having a maximum depth in the area of the feed section of the barrel and a decreasing depth through the compression section of the barrel in which the channel or channels disappear(s), whereby solid extrusion composition introduced to the feed section of the barrel is packed by the screw channel into the axial barrel grooves to form a rotating-resistant mass which is moved axially by the screw to substantially fill the solids conveying and compression sections of the barrel, thereby increasing the dead head pressure exerted by the extrusion composition and increasing the output of said composition from the extrusion orifice.

11. A method according to claim 10 in which the compression of the extrusion composition in the compression section of the barrel generates sufficient adiabatic heat to melt the composition without the need for applying external heat.

12. A method according to claim 10 which further comprises providing the feed section of the extrusion barrel with more circumferential clearance which facilitates the introduction of the solid extrusion composition into the axial grooves for the filling thereof.

13. A method according to claim 10 in which the extrusion barrel has a polygonal cross-section in the area of the feed and solids conveying sections to provide the plurality of axially-flat surfaces merging together to form said plurality of axial grooves.

* * * * *